United States Patent Office 3,432,305
Patented Mar. 11, 1969

3,432,305
PROCESS FOR IMPROVING TASTE IN FRUIT
PRODUCTS BY ADDING CYCLAMIC ACID
Wayne Kenneth Kuhr and Albin Joseph Slakis, Waukegan, Ill., and Richard Lawrence Hughes, West Roxbury, and Anne Josephine Neilson, Cambridge, Mass., assignors, by mesne assignments, to Abbott Laboratories, Chicago, Ill., a corporation of Illinois
No Drawing. Filed Dec. 16, 1964, Ser. No. 418,895
U.S. Cl. 99—28          11 Claims
Int. Cl. A23l 1/00, 1/02, 1/40

ABSTRACT OF THE DISCLOSURE

The process of enhancing the taste of fruit beverages, fruit juice, tomato soup and fruit concentrates by adding cyclamic acid between about .005 to .03% by weight to said fruit product.

---

The present invention relates to a method of improving the natural flavor of fruit products and fruit-flavored products. More particularly, it relates to the enhancement of the taste of fruit products and fruit-flavored beverages.

For the purpose of this description, it is to be understood that the term "fruit products" is inclusive of products made from natural fruits, e.g., frozen fruit juice concentrates, minced or chunked fruits, fruit-flavored beverages, e.g., artifically-flavored fruit drinks including the standard or dietetic kola drinks, etc. Thus, the term is used herein to encompass all fruit-flavored products which are processed.

The method of the present invention comprises essentially the addition of between 0.005% and 0.03% by weight of cyclohexylsulfamic acid (hereafter simply referred to as cyclamic acid) to fruit products. The flavor enhancement and the strengthening of the fruit-identity character obtained with this process can be achieved by adding the above amount of cyclamic acid to the fruit products during the processing of said products or immediately preceding consumption of said products. The method of this invention produces flavor enhancement in fruit juices, fruit-flavored gelatins and powdered beverages, jams, jellies, canned fruit, dried or frozen fruit, preserves, tomato soup, tomato sauce, and the various fruit or kola drinks, whether the fruit flavor present is natural or artificial and whether or not the beverage is carbonated.

It is surprising to find that the addition of between 0.005% and 0.03% by weight of cyclamic acid to such fruit products produces a significant difference in flavor characteristics, since that amount of cyclamic acid is very close to the threshold thereof. The threshold of cyclamic acid for acidity and sweetness begins at about 0.008% in spring water or distilled water but is considerably higher when tested in other media.

The effects of the method of the present invention are better described in view of the following examples which are illustrations only and are not meant as lamitations of the invention. In all these examples, the tastes and flavors of the control samples and the samples treated by the present method were compared by a highly specialized flavor panel using the "Flavor Profile Analysis" method established by Arthur D. Little, Inc. and published in "Flavor Research and Food Acceptance" (Reinhold Publishing Corporation, New York, 1958; pages 65 ff). In all examples, the fruit products were nationally known brands and were selected from manufacturers having high quality control standards.

By adding 0.03% by weight of cyclamic acid to canned, unsweetened grapefruit juice, the flavor improvement obtained comprises fuller body and more grapefruit identity over that of the control sample; also, no metallic off-flavor is observed in the test sample, while the control sample does have such a characteristic. Furthermore, the rindy grapefruit note observed in the control sample is reduced in the test sample. However, when using 0.05% cyclamic acid, the flavor blend is weakened, bringing out some unpleasant bitterness, in addition to the noted improvements.

With the addition of 0.005% by weight of cyclamic acid to a regular canned kola drink, the kola flavor is more pronounced; while the control sample has a bitter, sour note, the test sample is more blended and leaves a clean after-taste. The same improvements are also noted when a dietetic kola is substituted for the above regular, canned product.

With the addition of 0.03% by weight of cyclamic acid to canned orange juice, a better blended product with more flavor-body is obtained, having a more pronounced orange flavor than that of the control sample. The same observation is recorded when samples of the following items are treated in this manner and compared with their controls: frozen orange juice, artifically-flavored orange drink, a carbonated orange drink, and an orange-flavored powdered concentrate.

The addition of 0.03% by weight of cyclamic acid to apple juice lowers the cooked-apple aromatics and produces a more pronounced apple flavor with more flavor-body than the control.

The addition of 0.02–0.03% by weight of cyclamic acid to grape jelly strongly increases the grape identity over that of the control.

By adding 0.03% by weight of cyclamic acid to cranberry sauce, the cranberry identity is more pronounced and the metallic flavor present in the control sample is significantly reduced.

The addition of 0.017% by weight of cyclamic acid to a formulated raspberry gelatin dessert produces better flavor in that the sample has more raspberry identity. A similar improvement is obtained with strawberry gelatin, producing a stronger red-fruit identity. In contrast to these findings, the addition of cyclamic acid to unflavored gelatin increases the unpleasant protein note, and when it is added to coffee gelatin, a higher level of bitterness results.

The addition of 0.012% by weight of cyclamic acid to tomato soup produces a creamier, less salty, and more completely blended product with increased tomato identity over that of the control sample.

The addition of 0.01% by weight of cyclamic acid to canned tomato juice produces a stronger fresh-tomato identity and a creamier and smoother drink, while simultaneously lowering the sourness and green-tomato note in the product.

The addition of 0.03% by weight of cyclamic acid to canned tomato sauce removes the sour, metallic note of the control sample and produces better tomato identity in a creamier, better blended, bitey product.

The addition of 0.01% by weight of cyclamic acid to canned fruit cocktail produces a more pronounced fresh-fruit flavor with an improved sweet-sour flavor characteristic over that of the control. The same improvement is observed by adding 0.005% by weight of cyclamic acid to hula-punch.

By adding 0.025% by weight of cyclamic acid to a formulated lemon-lime fruit drink, the flavor enhancement is so strong that the lemon-lime flavor ingredients can be cut to some extent, or, conversely, the formula of the test sample can be diluted considerably to obtain a flavor equivalent to that of the control.

As will be seen from the above examples, the addition of 0.005% to 0.03% by weight of cyclamic acid to fruit products considerably enhances their natural flavor; in other words, cyclamic acid when used in these small quantities has the typical and surprising action of a flavor potentiator or enhancer having no other effect on the system to which it is added; particularly, the taste and flavor of cyclamic acid is not noted when it is used within the above limits. It augments the flavoring aromatics that are already present without contributing its own integers of taste and gives more flavor-body to the fruit-flavored product. The positive actions attributed to the present discovery are the increase in fullness of the flavor, the increase in identifying flavor aromatics, the increase in the creamy character of flavor (not of feeling or texture), and the blending or covering capability for such undesirable character notes as bitterness and metallic off-tastes, ordinarily preceived particularly in canned products. The potentiation effect of the present aromatics, be they completely natural or completely artificial, is of significant economic importance because it permits a reduction in concentration of the flavoring materials, the most costly ingredients in the above defined gruit-flavored products.

The amount specified above provides a simple guide line for producing the desired flavor improvements by the present method. It is to be understood that the amounts between 0.005% and 0.03% are to be calculated on the amount of finished consumer product; for instance, where a dry powder or other concentrate is used as the starting material for a flavored drink or a gelatin dessert, the amount of cyclamic acid to be added is to be determined within the above limits as based on the total weight of the finished product and not on the amount of concentrate used. When cyclamic acid is used at a level below 0.005% by weight, the flavor enhancement is below a level that can be detected by the majority of the consumers, and when the amounts used are above 0.03% by weight, some consumers may perceive the taste of cyclamic acid itself. Within these limits, the amounts of between 0.008% and 0.02% are preferred, and give a universally acceptable flavor enhancement without imparting to the fruit product the sour-sweet taste of cyclamic acid itself, even when tasted by the more sensitive consumers.

Others may practice the invention in various ways which will be obvious to one skilled in the art by the present disclosure. All such practice of the invention is considered a part hereof provided it falls within the scope of the appended claims.

We claim:

1. The process of enhancing the fruit flavor in fruit products comprising adding between 0.005% and 0.03% by weight of cyclamic acid to a fruit product, said amount of cyclamic acid being based on the total amount of a fruit product so prepared, said fruit product being selected from the group consisting of a canned fruit-flavored beverage, a fruit juice, tomato juice, tomato soup, and a fruit concentrate.

2. The process of claim 1 wherein said fruit product is a canned fruit-flavored beverage.

3. The process of claim 2 wherein said fruit-flavored beverage is carbonated.

4. The process of claim 3 wherein said carbonated beverage is kola-flavored.

5. The process of claim 4 wherein said kola-flavored beverage is a dietetic kola drink.

6. The process of claim 2 wherein said beverage is grapefruit juice.

7. The process of claim 2 wherein said beverage is tomato juice.

8. The process of claim 2 wherein said beverage is apple juice.

9. The process of claim 1 wherein said fruit product is tomato soup.

10. The process of claim 1 wherein said fruit product is a fruit concentrate.

11. The process of claim 10 wherein said fruit concentrate is a frozen juice concentrate.

References Cited

UNITED STATES PATENTS

| | | | |
|---|---|---|---|
| 2,865,756 | 12/1958 | Merory | 99—141 |
| 2,876,101 | 3/1959 | Bliudzius et al. | 99—141 |
| 2,876,107 | 3/1959 | Jucaitis et al. | 99—141 |

OTHER REFERENCES

Jacobs, M. B.: Carbonated Beverages (manufacture and analysis of) Chemical Publishing Co. Inc., New York, 1959, p. 14.

A. LOUIS MONACELL, *Primary Examiner.*

H. H. KLARE, III, *Assistant Examiner.*

U.S. Cl. X.R.

99—78, 79 105, 101, 100, 129, 140, 141